(12) United States Patent
Tate

(10) Patent No.: US 8,767,234 B2
(45) Date of Patent: Jul. 1, 2014

(54) HOME/OFFICE PRINTER FOR SELECTIVELY PRINTING AND TRANSMITTING PHOTOGRAPHS FROM A MEMORY CARD

(75) Inventor: Maria Del Carmen Tate, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2029 days.

(21) Appl. No.: 11/408,435

(22) Filed: Apr. 21, 2006

(65) Prior Publication Data

US 2007/0247527 A1 Oct. 25, 2007

(51) Int. Cl.
*G06F 3/12* (2006.01)
*G06K 15/00* (2006.01)
*H04N 1/46* (2006.01)

(52) U.S. Cl.
USPC .......... 358/1.15; 358/1.1; 358/1.16; 358/501; 358/508

(58) Field of Classification Search
None
See application file for complete search history.

(56) References Cited

U.S. PATENT DOCUMENTS

| 5,666,215 | A | 9/1997 | Fredlund et al. | |
|---|---|---|---|---|
| 6,715,003 | B1 | 3/2004 | Safai | |
| 6,762,852 | B1 | 7/2004 | Fischer | |
| 7,027,172 | B1 * | 4/2006 | Parulski et al. | 358/1.15 |
| 2002/0113980 | A1 * | 8/2002 | Reed | 358/1.6 |
| 2002/0181013 | A1 | 12/2002 | Dunlap | |
| 2002/0188525 | A1 | 12/2002 | Terada | |
| 2003/0193687 | A1 | 10/2003 | Parry | |
| 2003/0206312 | A1 * | 11/2003 | McAfee et al. | 358/1.15 |
| 2004/0039647 | A1 | 2/2004 | Roche | |

* cited by examiner

*Primary Examiner* — Ngon Nguyen

(57) ABSTRACT

A home/office printer for selectively printing and transmitting photographs as recorded on a memory card is disclosed. The printer includes a read-slot for inserting a memory card and a network coupling for transferring photographic images to an online printing service. The printer further includes an operating software, which is configured to print the photographic images recorded on a memory card and alternatively to transfer the photographic images data to an online printing service, as a print order, via the network coupling.

21 Claims, 2 Drawing Sheets

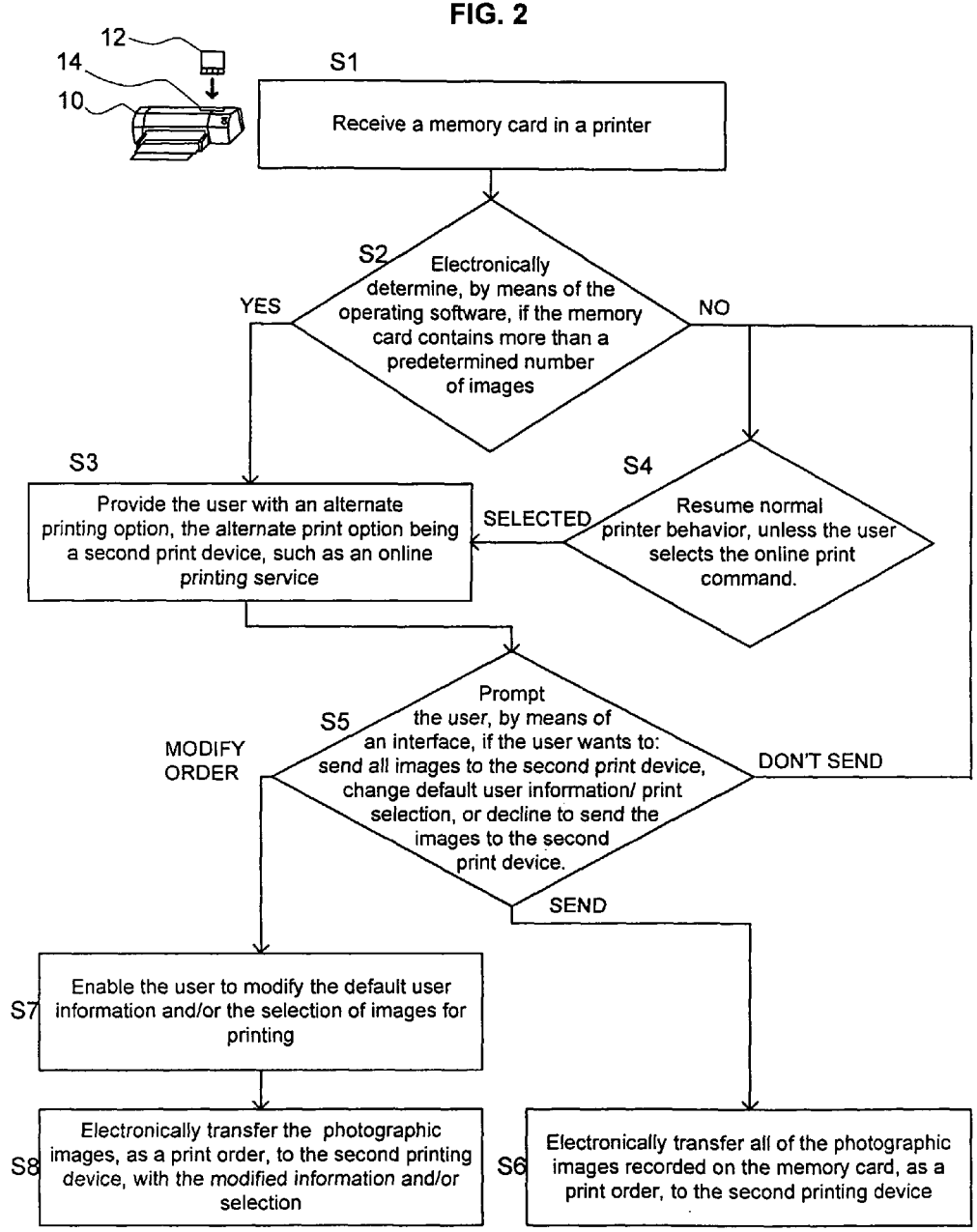

HOME/OFFICE PRINTER FOR SELECTIVELY PRINTING AND TRANSMITTING PHOTOGRAPHS FROM A MEMORY CARD

BACKGROUND

Digital cameras are becoming increasingly prevalent as a means for personal and recreational photography. Historically, color photography required complex photo processing, such as developing exposed images, a process that most often required a dark room or other special equipment. Because this process was often time-consuming and expensive, most people would take their undeveloped film to a photo lab or kiosk for developing. With the advent of digital photography, photo printing from home/office printers became possible. These home/office photo-quality printers allow users to print digital images on photo paper. However, because home printers must be maintained by the user, such as replacing empty ink cartridges and maintaining a supply of photo paper, users often consider the process expensive and time consuming. Subsequently, users often search for alternative print sources for large print jobs, such as retail service photo printers and online photo printing services.

While retail services, such as photo kiosks, can offer an economically competitive alternative to home printing, the process can be time-consuming and lack the privacy of home photo printing. Typically, kiosks and photo processing labs require a customer to stand in line at a photo kiosk where they upload their images, fill out an order form, pay a cashier, and finally wait at least an hour before the prints are done. Often a customer will leave and return within the next few days.

Online photo printing services offer an alternative to photo kiosks. These websites offer a customer a greater sense of privacy, while allowing a user to stay at home while placing an online print order for their digital photographs. However, PC and software complexities often add difficulty to this process. Typically, a customer will have to open a software package in order to access their digital images. These digital images then have to be uploaded to the website, where the user would then fill out an order form, specifying shipping and billing information. Some novice computer users, find this process an intimidating task, and prefer to use retail services where they can freely ask for assistance from a retail service employee.

BRIEF DESCRIPTION OF THE DRAWINGS

FIG. 2 is a flowchart of a method for processing a photographic print order, in accordance with an embodiment of the present invention.

Figure 1:
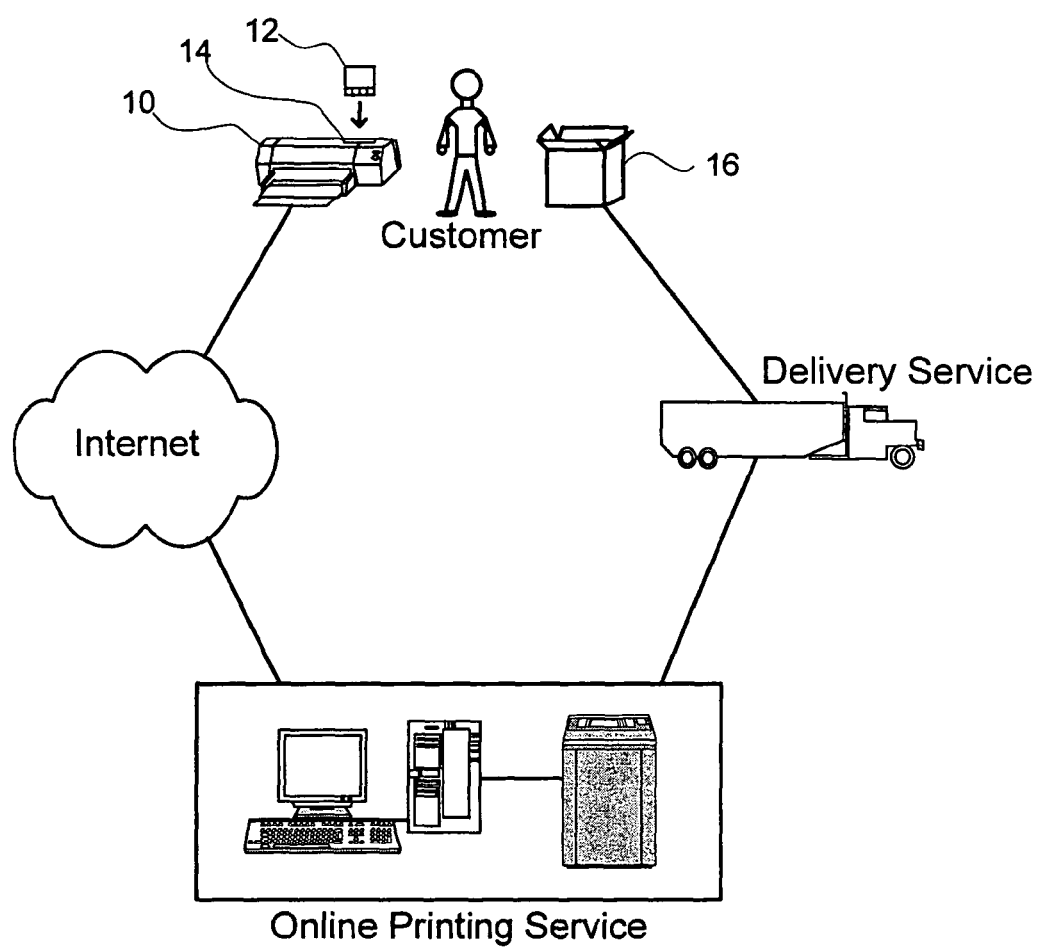
FIG. 1 is an illustration of an online printing service network, in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention, as represented in FIGS. 1 through 2, is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

The term "printer" as used herein, shall be understood to mean an electronic printing device. Examples of printers include, but are not limited to, laser printers and inkjet printers.

The term "memory card" as used herein, refers to portable electronic memory storage devices. In addition, the term "camera memory card" as used herein, refers to memory cards that are configured to be used in a digital camera.

The term "print order" as used herein, refers to a complete set of information/data and/or material that is sent to a print service in order to supply an online printing service with sufficient information to complete a printing job and deliver the printed material to the customer. For example, a print order can include: a complete set of photographic image data, paper size/type information, and billing/shipping information. A print order can also include user information such as a password and login, or a computer identification that would allow a server to recognize a user and use default print order information that the user had preset.

FIG. 1 shows a printer 10, in an example implementation in accordance with the invention, having a read-slot 14 configured to removably receive a memory card 12. A network coupling is configured to couple the printer to a communication network, such as the Internet, as shown in the figure. In this manner, the printer can transfer a photographic (photo) print order to an online printing service. The printing service can print the print order and send the printer photos to the customer. Typically, an online printing service can send the packaged, printed photos 16 to the customer via a delivery service. Generally, three to five business days later, the packaged, printed photos will be delivered to the customer/user by the delivery service.

The memory card 12 can be a variety of memory devices, including an SD™ card (Secure Digital card), a CompactFlash I™ card, a CompactFlash II™ card, a SmartMedia™ card, a Memory Stick™, Memory Stick Duo™, a Memory Stick Micro M2™, a Multi Media card, a MMCmicro™ card, a RS-MMC card™, a microSD™ card, a miniSD™, a MMC-Mobile™ card, XD-Picture card™, a CompactFlash™, flash drives having a USB interface, and the like, with the read-slot 14 configured to receive a respective memory card. Suitably, the printer is configured to recognize the presence of an inserted card and read the data recorded thereon.

The printer 10 includes a network coupling, which can be an Ethernet coupling, wireless receiver/transmitter, cable connection, and the like. The network coupling is configured to couple the printer to a communication network or plurality of communication networks, for use in transferring photographic image data. In one detailed aspect of the invention, the communication network can be the Internet. Alternatively, the communication network can a single network or combination of networks, including: a local area network (LAN), a metropolitan area network (MAN), a wide area network (WAN), a virtual private network (VPN), and the like. Various protocols such as internet protocol (IP), asynchronous transfer mode (ATM), and the like may be used. It will also be noted, that the printer can operate independently of any additional processing devices, such as a personal computer (PC) or server.

According to one aspect of the invention, the printer 10 can include a display screen (not shown). The display screen can display the contents of a memory card 12, photograhic image previews, and/or a variety of user interface screens. A display screen can be an LCD color display panel, or more simple display as will be practical with the invention.

The printer 10 further includes an operating software that can enable a user to print photographic images recorded on the memory card 12 from the printer. Further, the operating software can enable a user to automatically transfer the photographic image data to an online printing service, via the network coupling. The operating software can be platform software, such as an operating system or firmware, or an application software, or a combination of platform software and application software.

The operating software can be configured to process the photographic image data recorded by a camera on a memory card 12 that has been inserted into the read-slot 14. Further, the operating software is configured to transmit the photographic image data to a chosen printer for printing. A chosen printer can include the printer wherein the memory card has been inserted. As mentioned, a chosen printer can likewise include an online printing service, such as Snapfish.com, and the like. Alternatively, a chosen printer can include: a photographic printing service coupled to a local area network (LAN), a virtual private network (VPN), or a metropolitan area network (MAN).

Upon recognition of an inserted memory card 12, the operating software can determine if the card contains more than a triggering, predefined number of photographic images. In the instance that a memory card contains more photographic images than the predefined number, the operating software can prompt the user to selectively transfer the photos to an alternate printing device. The user prompt can include a user interface, displayed on a display screen. The interface can ask the user if the user would like to send all of the photographic images to an alternate printing device for printing. If the user responds "no", then the software can instruct the printer to resume normal print behavior. Normal print behavior may include, presenting the user with a print interface, such as a print menu or the like. If the user responds "yes", the software can then automatically electronically transfer the photographic images to the alternate print device. In one detailed aspect of the invention, the software can electronically transfer all of the photographic images recorded on the memory card to the alternate print device in response to a single user-action. The single user-action can be the action of responding "yes", as previously described, by means of pressing a button or key, selecting an icon, or touching a selected portion of a touch screen.

In another aspect of the invention, the software prompt can be a user interface, namely a direct print order menu. The direct print order menu can enable a user to transfer all the photographic images recorded on the memory card 12 to an alternate print device by means of a single user-action, as previously described. Additionally, a direct print order menu may enable a user to change default user information, select individual photographic images to be transferred, and subsequently request electronic transfer of the selected photographic images to the alternate print device. Default user information can include: user shipping information, such as home address, user name, etc; billing information, including credit card information and the like; paper size and type; and other information that will be practical for placing a print order. Suitably, default user information can vary with the alternate print devices. For instance, a particular online printing service may require a login and password or transmission of the computer identification, wherein shipping, billing and photographic paper information is stored on the respective server. Alternatively, other online printing services may require user information to be be maintained by the printer 10 and transmitted with each print order.

In one aspect of the invention, the default user information can be set up when the user initially installed the printer 10.

The triggering, predefined number of photographic images, used by the software to trigger an alternate print device interface, can be a user-defined quantity or a preconfigured or hard-coded quantity. It has been recognized that a user may often consider it expensive or time-consuming to print a large number of prints from a home/office printer 10. As such, the software can be configured to determine if a memory card 12 contains more than a triggering, predefined number of photographic images. For example, the triggering, predefined number of images can be ten images. Accordingly, if a memory card is inserted into the printer containing fifteen images, the software will determine that this number is greater than the predefined number of ten images, and the software will prompt the user to transfer all fifteen photographs, or selected photographs to an online printing service.

In another aspect of the invention, the printer 10 can include a means for manually initiating a prompt by the operating software to transfer the photographic image data automatically from the memory card to an online printing service. This means for manually initiating a prompt by the operating software, can include: an external button, a button/key on a keypad/keyboard, an icon on a display screen, an icon on a touch screen, an external switch, and the like. This feature, or online print command, may be employed in the instance that a memory card is inserted into the printer that does not contain more than the predefined number of photographic images, but whereas the user desires to send the print job to an online printing service. In this instance, the user can select this feature whereupon the operating software can respond by prompting the user to selectively transfer the images to an online printing service. The means for manually initiating a prompt can also be referred to as an online print command.

FIG. 2 shows a method for processing the receipt of a memory card 12 in the read-slot 14 of a printer 10, in an example implementation in accordance with the invention. As will be apparent to one of ordinary skill in the art, the following steps can be controlled by means of the operating software.

At step S1, a memory card 12 is received in the read slot 14 of a printer 10, wherein the printer is configured for printing photographs.

At step S2, the printer 10 electronically determines, by means of the operating software, if the memory card contains more than a predefined number of images. If the card contains more than this predefined number the printer proceeds with step S3, else the printer proceeds with step S4 by resuming normal printer behavior.

At step S4, the printer will proceeding in normal printer behavior unless the user selects the online print command, wherein the printer will proceed to step S3.

At step S3, the printer provides the user with an alternate printing option. The alternate printing option can be a second print device, such as an online printing service. This step can take the form of a user prompt, such as a user interface, namely an online printing service order menu, or another means that can be recognizable to the user as verification that a second printing device option can now be selected. It will be noted that this step can be combined with at least a portion of step S5, wherein the printer prompts the user to send all the images to the alternate print source with the default information. This combination can be incorporated into a single interface, such as a direct print order menu, having multiple menu options, or a plurality or sequence of interfaces.

At step S5, the printer prompts the user, to send all of the images recorded on the memory card 12 to the second print device with the default information, or decline to send the images to the second print device, or change the default information before sending the images to the second print device. As previously noted, this step can be incorporated with step S3, wherein the prompt is included in a user interface, such as an online printing service order menu. If the user selects to send all the images, and does not select to change the default user information, the printer can proceed with step S6 of electronically transferring all of the photographic images recorded on the memory card, as a print order, to the second printing device. It will be noted here, that these steps, S3, S5, and S6, can be accomplished with a single action by the user, such as pressing one key, button, or icon, in step S5. For example, if a user inserts a camera memory card containing thirty images, and the predefined number of images is ten, the printer can prompt the user, "Would you like to send all these images to Snapfish.com for processing?" If the user responds "yes", the printer would automatically transfer those images via the network coupling to Snapfish.com, as per step S6. If the user responds "no", the printer would resume normal behavior, as per step S4

In one detailed aspect of the invention, the step S5 can be incorporated into a user interface or more particularly an online print service order menu. This menu can include an icon, button, or option whereby the user can select to modify the default user information and/or the print selection before sending the images to the second printing device. If this option is selected the printer will proceed to step S7. For example, a user may insert a memory card 12 containing thirty images, being more than the predefined number of images, which can be ten. If the user only wishes to send five of these prints to the second printing device, the user can select, from the online print service order menu an option to change the print selection. In a subsequent menu screen the user can modify the selection of images to be sent to the second printing device.

The online print order screen can be further configured to provide the user with a plurality of print options. These options can include, cropping and sizing an image, changing an image from color to black and white, removing "red eye", and other photo editing procedures that will be practical with the invention.

At step 7, the printer can enable to user to modify the default user information and the selection of images for printing. Further, at this step the printer can enable the user to make other modifications, such as cropping, and others previously mentioned. Upon completion of these modifications a user can select to electronically transfer the photographic images, as a print order, to the second printing device, with the modified information and/or selection, as per step S8. The process of electronically transferring the photographic images to the second printing device can include various operating software procedures, wherein the operating software procedures may include transferring information to an online printing service, accessing a user profile, uploading photographic image data, transferring print order and user information, receiving print order confirmation, and other processor and networking operations.

In another detailed aspect of the invention, upon completion of step S8 and S6, the printer can display or confirmation receipt.

In yet another detailed aspect of the invention, upon completion of step S8 and S6, the printer can proceed to step S4, wherein the printer resumes normal printer behavior.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A home/office printer for selectively printing and transmitting photographs as recorded on a memory card, the printer comprising:

a printer configured for printing photographs, the printer having a read-slot configured to receive a memory card;

said printer further including a network coupling configured to couple the printer to a communication network, the network coupling useful for transferring photographic image data; and an operating software for use with the printer and operable independently of an additional processing device, configured to determine if the memory card contains more than a triggering, predefined number of photographic images and to enable a user to print photographic images recorded on the memory card from the printer and to alternatively transfer the photographic image data automatically from the memory card to an online printing service, as an online print order, via the network coupling.

2. The printer of claim 1, wherein the printer includes a means for manually initiating a prompt by the operating software to transfer the photographic image data automatically from the memory card to an online printing service, as an online print order, via the network coupling.

3. The printer of claim 1, wherein the communication network includes the Internet.

4. The printer of claim 1, wherein the memory card is selected from the group consisting of:

an SD™ card (Secure Digital card), a CompactFlash I™ card, a CompactFlash II™ card, a SmartMedia™ card, a Memory Stick™, Memory Stick Duo™, a Memory Stick Micro M2™, a Multi Media card, a MMCmicro™ card, a RS-MMC card™, a microSD™ card, a miniSD™, a MMCMobile™ card, XD-Picture card™, a CompactFlash™, flash drives having a USB interface.

5. A method for selectively printing photographs on a chosen printer as recorded on a memory card independently of an additional processing device, the method comprising:

receiving a memory card in a first printing device configured for printing photographs;

electronically determining if the memory card contains more than a triggering, predefined number of photographic images;

automatically providing a user with an alternate printing option if the memory card contains more than the predefined number of photographic images, the alternate printing option utilizing a coupled, second print device; and electronically transferring the photographic images to the second printing device upon selection by the user.

6. A method as in claim 5, wherein the method further comprises:

automatically providing a user with an alternate printing option if an online print command is chosen, the alternate printing option utilizing a coupled, second print device; and electronically transferring the photographic images to the second printing device upon selection by the user.

7. The method of claim 6, wherein selecting an online print command includes:

pressing a button on a control panel, pressing on a keyboard key, or selecting an icon.

8. The method of claim 5, wherein the step of automatically providing a user with an alternate print option includes initiating a direct print order menu.

9. The method of claim 8, wherein the direct print order menu includes enabling the user to send all of the photographic images, or a selected portion of the photographic images, contained on the memory card to the second print device.

10. The method of claim 8, wherein the direct print order menu includes enabling the user to send all of the images to the second print device with a single user-action.

11. The method of claim 8, wherein the direct print order menu includes enabling the user to change default user information.

12. The method of claim 11, wherein the first printing device enables the user to configure the default user information during the initial installation of the printer.

13. The method of claim 5, wherein electronically transferring the photographic images to a second print device includes electronically transferring the photographic images to an online printing service.

14. The method of claim 13, wherein the step of electronically transferring further includes sending an online print order to the online printing service.

15. The method of claim 14, wherein the step of electronically transferring further includes sending user information to an online printing service, the user information can include: shipping information, billing information, paper size, and paper type, and the like.

16. A computer readable medium for use in a printer system independent of an additional processing device to process photographic image data as recorded on a memory card and selectively transmit the photographic image data to a chosen printer for printing, the computer readable medium bearing software configured to, when used with a printer system:

determine if a memory card, that has been inserted into a printing device, contains more than a triggering, predefined number of photographic images;

selectively transfer the photographic images to an alternate print device in response to a user prompt if the memory card contains more than a triggering, predefined number of photographic images;

receive and process photographic image data from the memory card;

electronically transfer the photographic images automatically to the alternate print device for printing if the user selects to transfer the photographic images to the alternate print device; and resume normal printer behavior if the user does not select to transfer the photographic images to the alternate print device.

17. The computer readable medium of claim 16, wherein the predefined number of photographic images is approximately 10.

18. The computer readable medium of claim 16, wherein the alternate print device is an online printing service.

19. The computer readable medium of claim 18, wherein the process of prompting a user comprises displaying a user interface, namely a direct print order menu.

20. The computer readable medium of claim 19, wherein the direct print order menu allows the user to: change default user information; select to send all of the photographic images or a selected portion of the photographic images contained on the memory card to the alternate print device; and submit the print order.

21. The computer readable medium of claim 20, wherein the default user information is maintained by the printing device.

* * * * *

UNITED STATES PATENT AND TRADEMARK OFFICE
CERTIFICATE OF CORRECTION

Page 1 of 1

PATENT NO. : 8,767,234 B2
APPLICATION NO. : 11/408435
DATED : July 1, 2014
INVENTOR(S) : Maria Del Carmen Tate It is certified that error appears in the above-identified patent and that said Letters Patent is hereby corrected as shown below:

In the claims

In column 8, lines 5-6, in Claim 16, delete "to-process" and insert -- to process --, therefor.

Signed and Sealed this
Twenty-ninth Day of December, 2015

Michelle K. Lee
*Director of the United States Patent and Trademark Office*